US012338959B1

(12) United States Patent
Chen

(10) Patent No.: US 12,338,959 B1
(45) Date of Patent: Jun. 24, 2025

(54) DECORATIVE LIGHTING STRINGS AND BULBS WITH LIGHT-EMITTING DIODES

(71) Applicant: Willis Electric Co., Ltd, Taipei (TW)

(72) Inventor: Johnny Chen, Taipei (TW)

(73) Assignee: Willis Electric Co., Ltd., Taipei (TW)

( * ) Notice: Subject to any disclaimer, the term of this patent is extended or adjusted under 35 U.S.C. 154(b) by 0 days.

(21) Appl. No.: 18/891,299

(22) Filed: Sep. 20, 2024

Related U.S. Application Data

(60) Provisional application No. 63/584,019, filed on Sep. 20, 2023.

(51) Int. Cl.
*F21K 9/237* (2016.01)
*F21S 4/10* (2016.01)
*F21V 21/002* (2006.01)
*F21V 31/00* (2006.01)

(52) U.S. Cl.
CPC ................ *F21K 9/237* (2016.08); *F21S 4/10* (2016.01); *F21V 21/002* (2013.01); *F21V 31/005* (2013.01)

(58) Field of Classification Search
CPC .. F21S 4/10; F21S 4/15; F21V 31/005; F21K 9/23
See application file for complete search history.

(56) References Cited

U.S. PATENT DOCUMENTS 10,823,376 B1 * 11/2020 Wang .................. F21V 19/0025
11,293,596 B1 * 4/2022 Wang ...................... F21K 9/238
11,293,599 B1 * 4/2022 Wang .................... F21V 31/005
11,788,711 B1 * 10/2023 Wu ....................... F21V 23/002 362/363
11,867,368 B1 * 1/2024 Ren ......................... F21V 23/06
12,055,275 B1 * 8/2024 Zou ........................... F21S 4/10
12,152,740 B1 * 11/2024 Wang .................... F21V 31/005
2012/0217862 A1 * 8/2012 Matsuda ................. F21K 9/232 313/46
2014/0152177 A1 * 6/2014 Matsuda .................. F21K 9/23 315/32
2018/0372278 A1 * 12/2018 Zhang ..................... F21K 9/237
2023/0047982 A1 * 2/2023 Wu ........................... F21S 4/10
2023/0082893 A1 * 3/2023 Li ........................... F21V 31/04 362/249.02
2023/0151934 A1 * 5/2023 Lei .......................... F21K 9/238 362/217.14
2023/0258303 A1 * 8/2023 Huang .................... F21K 9/238 315/185 R
2023/0408045 A1 * 12/2023 Qin ......................... F21V 17/16
2024/0142066 A1 * 5/2024 Li ....................... F21V 19/0005
2024/0353073 A1 * 10/2024 Liang ...................... F21K 9/235

* cited by examiner

*Primary Examiner* — Alexander K Garlen
(74) *Attorney, Agent, or Firm* — Christensen, Fonder, Dardi & Herbert PLLC; John P. Fonder

(57) ABSTRACT

A water-resistant, push-in type decorative-lighting assembly, including: a reflector defining a reflector cavity; an LED assembly including a plurality of light-emitting diodes (LEDs); a pair of conductive connectors electrically connected to the LED assembly, including a first conductive connector electrically connected to a first end of the LED assembly and a second conductive connector electrically connected to a second end of the LED assembly; a base portion including a body portion, a projection portion projecting from a bottom end of the body portion, and an LED support portion; and a lamp socket defining an upper cavity receiving the body portion of the base portion and a lower cavity receiving the projection portion of the base portion and ends of the first and second conductive connectors.

20 Claims, 11 Drawing Sheets

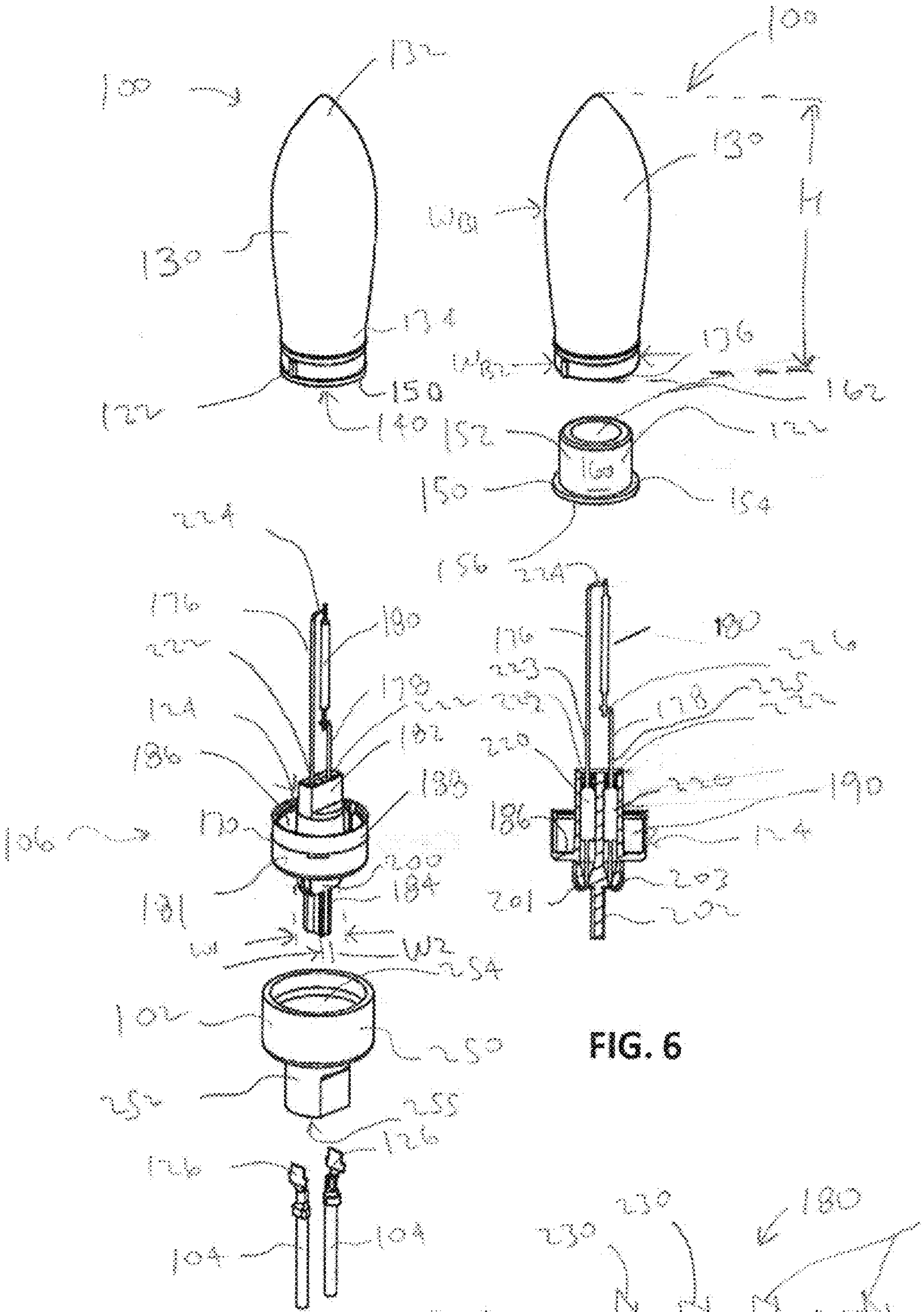
FIG. 6
FIG. 5
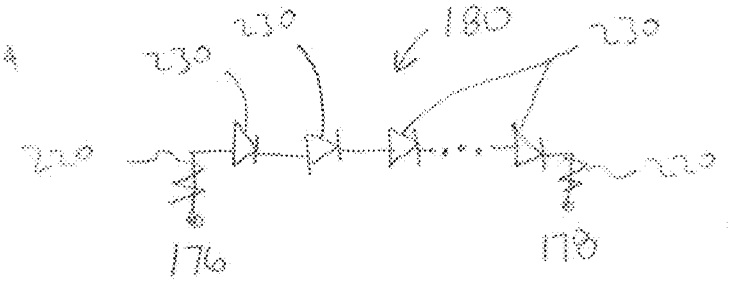
FIG. 6A

DECORATIVE LIGHTING STRINGS AND BULBS WITH LIGHT-EMITTING DIODES

CROSS-REFERENCE TO RELATED APPLICATIONS

This application claims the benefit of U.S. Provisional Patent Application No. 63/584,019, filed Sep. 20, 2023, which is incorporated herein in its entirety.

FIELD OF THE INVENTION

This disclosure relates to seasonal and decorative lighting. More specifically, the disclosure relates to decorative-lighting strings and decorative-lighting bulbs having multiple light-emitting

BACKGROUND

Incandescent bulbs used in decorative lighting, and in particular, large-globe or large-reflector light bulbs, such as candelabra or "C" bulbs with screw-type lamp bases, provide significant light output as compared to smaller incandescent bulbs, such as "mini" bulbs. However, traditional, large-reflector incandescent bulbs tend to generate significant heat and draw high power. Consequently, the decorative-lighting industry turned to large-reflector bulbs with light-emitting diodes (LEDs) having good light output and at a significant energy-use reduction. However, known large-reflector bulbs remain relatively inconvenient to use in lighting strings with many bulbs, and at a relatively high cost, and may not be water resistant.

SUMMARY

Embodiments of the present disclosure overcome the shortcomings of known large-reflector bulbs by providing convenient-to-use, cost-effective large-reflector LED bulbs that may be water resistant, for decorative lighting strings.

In an embodiment, a water-resistant, push-in type decorative-lighting assembly, includes: a reflector defining a reflector cavity; an LED assembly including a plurality of light-emitting diodes (LEDs); a pair of conductive connectors electrically connected to the LED assembly, including a first conductive connector electrically connected to a first end of the LED assembly and a second conductive connector electrically connected to a second end of the LED assembly; a base portion including a body portion, a projection portion projecting from a bottom end of the body portion, and an LED support portion, the body portion defining a cavity receiving a lower portion of the reflector, and the body portion defining a first channel and a second channel, the first channel receiving a portion of the first conductive connector and the second channel receiving a portion of the second conductive connector, an end of the first conductive connector extending out of the first channel and an end of the second conductive connector extending out of the second channel; and a lamp socket defining an upper cavity receiving the body portion of the base portion and a lower cavity receiving the projection portion of the base portion and the ends of the first and second conductive connectors.

In another embodiment, a decorative-lighting string comprises: a power plug configured to electrically connect to a power source; a plurality of decorative-lighting assemblies, each decorative-lighting assembly of the plurality of decorative-lighting assemblies including a reflector defining a reflector cavity, an LED assembly including a plurality of light-emitting diodes (LEDs), a pair of conductive connectors electrically connected to the LED assembly, including a first conductive connector electrically connected to a first end of the LED assembly and a second conductive connector electrically connected to a second end of the LED assembly, a base portion including a body portion, a projection portion projecting from a bottom end of the body portion, and an LED support portion, the body portion receiving a lower portion of the reflector, a portion of the first conductive connector and a portion of the second conductive connector, an end of the first conductive connector extending out of base portion and an end of the second conductive connector extending out of the base portion and a lamp socket receiving the body portion of the base portion and the ends of the first and second conductive connectors; and a plurality of wires in electrical connection with the plurality of decorative-lighting assemblies.

BRIEF DESCRIPTION OF THE DRAWINGS

The invention can be understood in consideration of the following detailed description of various embodiments of the invention in connection with the accompanying drawings, in which:

FIG. 5 is an exploded view of an embodiment of an LED lamp assembly;

FIG. 6 is a perspective view of a globe or reflector, sealing portion, and base portion (in cross section), of an LED lamp assembly, according to an embodiment of the present disclosure;

FIG. 6A is an electrical schematic diagram of an LED bulb assembly, according to an embodiment of the present disclosure;

Figure 1:
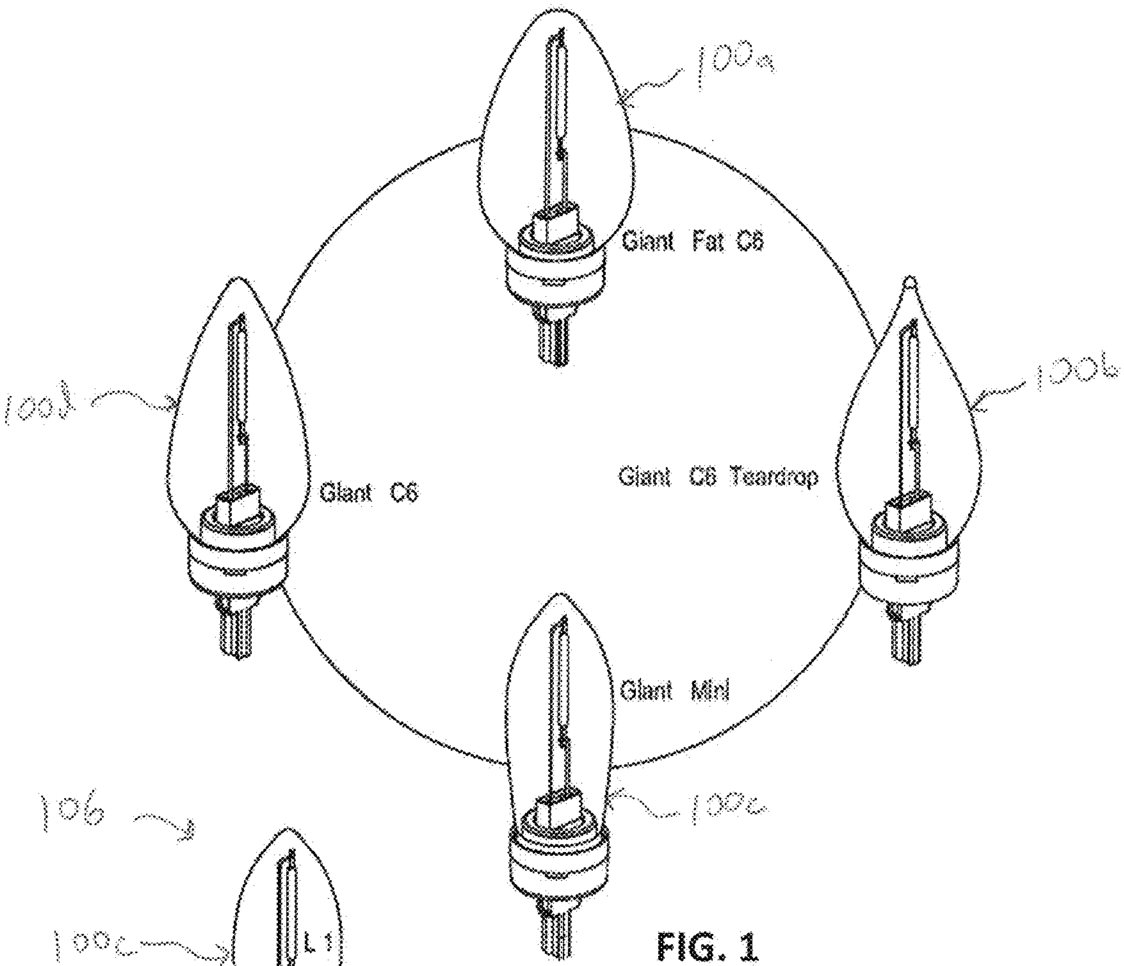
FIG. 1 is a perspective view of several embodiments of large-reflector, push-in type LED bulb assemblies, according to the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

Referring to FIG. 1, embodiments of large-reflector LED bulb assemblies 100, including large-reflector or large reflector LED bulb assemblies 100*a*, 100*b*, 100*c* and 100*d* are depicted. As depicted in FIG. 1, each large-reflector LED bulb assembly 100 is substantially the same with the exception of reflector size, as described further below. Herein, each large-reflector LED bulb assembly will be referred to as a large-reflector LED bulb assembly 100, though a globe or reflector size may vary, and may be used in a particular LED bulb assembly 100*a*, 100*b*, 100*c*, 100*d* or another LED bulb assembly with a different type of globe or reflector.

Figure 3:
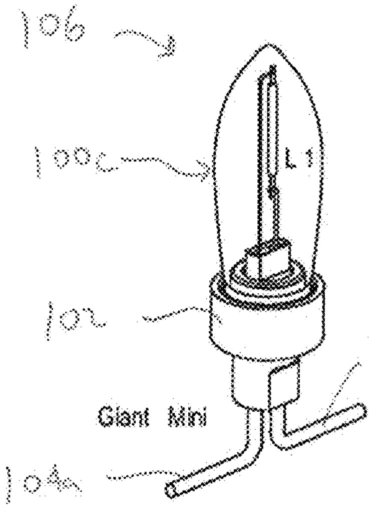
FIG. 3 is a perspective view of an embodiment of an LED bulb assembly according to FIG. 1 assembled into the lamp socket and wires of FIG. 2.
Figure 2:
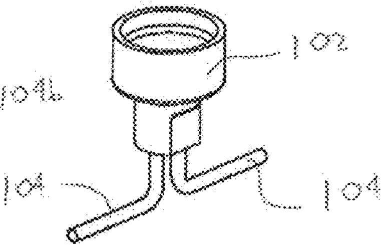
FIG. 2 is a perspective view of a lamp holder with wires, configured to received one of the LED bulb assemblies of FIG. 2, according to an embodiment of the present disclosure.

Referring also to FIGS. 2 and 3, each large-reflector LED bulb assembly 100 is configured to fit into a lamp socket or lamp holder 102, which will be described in further detail below. Insulated conductors or wires 104 are electrically connected to large-reflector LED bulb assemblies 100 and mechanically connected to lamp sockets 102. Each large-reflector LED bulb assembly 100 with a lamp socket 102 forms a large-reflector, or large-reflector LED decorative lighting assembly 106.

Figure 4:
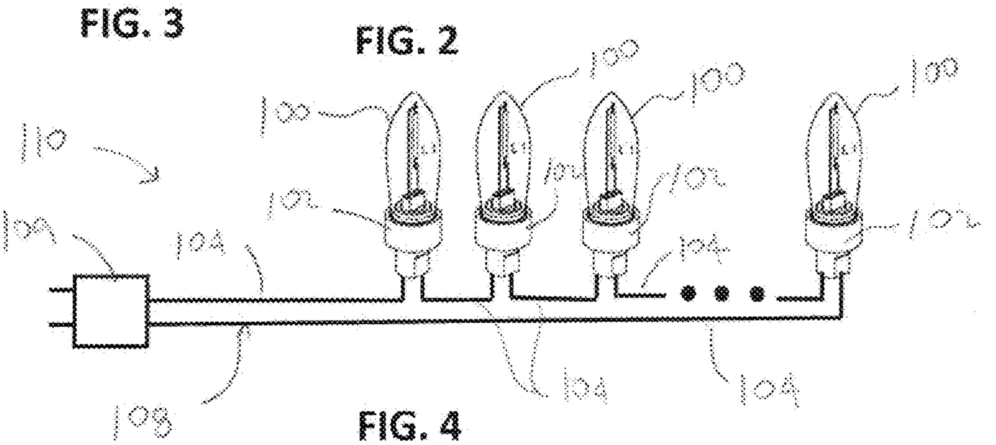
FIG. 4 is an embodiment of a series-connected light set that includes a plurality of LED bulb assemblies.

Referring also to FIG. 4, multiple LED decorative-lighting assemblies 106, each with a large-reflector LED bulb assembly 100 and lamp socket 102 are electrically connected to one another via set 108 of insulated conductors 104 to form decorative-lighting string 110. In the embodiment of decorative-lighting string 110 depicted, large-reflector LED bulb assemblies 100 are electrically connected in series. However, in other embodiments, not depicted, large-reflector LED bulb assemblies 100 may be electrically connected in parallel. In yet other embodiments, a first group of large-reflector LED bulb assemblies 100 comprises multiple large-reflector LED bulb assemblies 100 that are electrically connected in series to one another, and a second group of large-reflector LED bulb assemblies 100 comprises multiple large-reflector LED bulb assemblies 100 that are electrically connected in series to one another, and the first group of LED bulb assemblies is electrically connected to the second group of LED bulb assemblies in parallel. Such a decorative-lighting string 110 forms a series-parallel connected lighting string 110.

In an embodiment, LED lamp assembly 180 may include a first group of LEDs 230 electrically connected in series and a second group of LEDs 230 electrically connected in series, with the two groups electrically connected in parallel, and wherein the two groups are oppositely polarized, i.e., the diode groups are connected "back-to-back" such that for current flow in a first direction, a first group of diodes illuminates, while a second group does not, and for current flow in a second direction, the first group of diodes does not illuminate, while the second group does illuminate. Such a configuration may be used when alternating current (AC) power is applied to LED assembly 180, such that the LED groups alternate illuminating based on alternating positive and negative voltages delivered by the AC power source.

In an embodiment, and as depicted, LED assembly 180 may be generally long and narrow, and may be positioned such that LED assembly 180 is extending vertically within reflector 130.

In an embodiment, each push-in, large-reflector LED bulb assembly 100 is configured to operate with 120 VAC, and all bulb assemblies 100 may be electrically connected in parallel in decorative lighting string 110. In another embodiment, each large-reflector LED bulb assembly 100 is configured to operate with 24 VAC, and all push-in type large-reflector LED bulb assemblies 100 may be electrically connected in series in a decorative lighting string 110. In one such embodiment, decorative lighting string 110 may include five push-in type large-reflector LED bulb assemblies, such that a decorative lighting string may be connected to a 120 VAC power source via power plug 109. In one such embodiments, each LED lamp assembly 180 may include eight 3-volt LEDs 230 electrically connected in series.

Most known large-reflector lighting strings include screw-base candelabra bulbs, e.g., C9 lighting strings, that require a user to screw in each bulb into a socket. As will become evident with the description below, embodiments of the present disclosure provide "push-in" type large-reflector LED bulb assemblies 100 which are easier to install and replace and are cost effective.

Although decorative-lighting string 110 is depicted as having four assemblies 100, it will be understood that decorative-lighting string 110 may include more or fewer than four assemblies. Further in a series-parallel decorative-lighting string 110, more than two groups may be included. The number of large-reflector LED bulb assemblies 100 and the number of groups may depend on various factors, including available power source voltage, including whether a power converter or adapter is used. In an embodiment, decorative-lighting string 110 may include a power adapter, not depicted, to convert available source power to a lower voltage power, in addition to a plurality of large-reflector LED bulb assemblies 100, lamp sockets 102, insulated conductors (wires) 104 and power plug 109.

Referring to FIG. 5, an embodiment of decorative-lighting assembly 106 with large-reflector LED bulb assembly 100 and wires 104 is depicted. FIG. 5 is an exploded view of decorative-lighting assembly 106. Referring also to FIG. 6, an exploded view of large-reflector LED bulb assembly 100 with a portion in cross section is depicted. Referring also to FIG. 6D, various exploded views of large-reflector LED bulb assembly are depicted.

In an embodiment, large-reflector LED bulb assembly 100 includes globe or reflector 130 with interior reflector cavity 133 (having lower cavity 133*a* and upper cavity 133*b*), sealing portion 122, LED lighting assembly 124, lamp socket or lamp holder 102 and a pair of wires 104, each with a conductive terminal 126.

Referring also to FIG. 1, the term "globe" or "reflector" will be understood to refer to a globe, reflector, cover, optic, and so on, having various shapes, as described below, and which cover other components of the lam assembly, such as the LED element, and may reflect, diffuse or transmit light from the LED element. Globe or reflector 130 may be a relatively large globe or reflector, as compared to miniature bulbs, with a maximum width WB1 at a middle or top being greater than a minimum width WB2 at a base.

In embodiments, reflectors 130 may form known shapes, such as a candelabra (100*b*), "fat" or enlarged candelabra (100*a*), teardrop candelabra (100*b*) or oversized or "giant" mini bulb (100*c*), though other shape may be possible. Reflector 130 sizes may vary, and in an embodiment are "C" shaped reflectors of known, standard sizes, such as "C3" with maximum width WB1 being approximately 0.5" and height H being approximately 0.8"; "C6" with maximum width WB1 being approximately 0.5" and height H being approximately 0.8"; "C7" WB1 being approximately 1.0" and H being 1.5"; or "C9" size WB1 being approximately 1.25" and H being 2.5"; which are standard sizes used in seasonal and decorative lighting, and as will be understood by those of ordinary skill in the art of seasonal and decorative lighting, including Christmas lighting.

In an embodiment, maximum width WB1 is in a range of 0.5" to 1.25" and height His in a range of 0.8" to 2.5".

In other embodiments, reflector 130 may comprise shapes other than C shapes, such as round or spherical "G" or "globe" shapes, such as G12, G15, G20, G25 and so on. As understood by those of ordinary skill, a diameter of a G bulb is determined by dividing the number after the "G" by 8, then rounding to the closest inch. For example, a G25 bulb has a diameter that is approximately 3.1" or more roughly, 3" in diameter.

Known C-bulb and globe-bulb assemblies, particularly for incandescent bulbs, and sometimes for LED bulbs, will be constructed of glass. However, glass is fragile and subject to breaking. Consequently, although in some embodiments, reflectors 130 may comprise glass, an alternate material includes clear polymer materials. In one such embodiment, reflector 130 comprises a polycarbonate material.

In an embodiment, reflector 130 includes top portion 132, bottom portion 134 with rim 136 and defines cavity 138 with opening 140. In an embodiment, rim 136 forms a circular shape, though other shapes are contemplated. Reflector 130 may also include projection or key 139 at bottom portion 134. As described further below, projection 139 may be aligned with a complementary recess or slot in Sealing portion 122, also referred to as a waterproof ring, in an embodiment, comprises base portion 150 with body portion 152. Base portion 150 forms an annular ring or flange, which may be circular in shape, and includes top surface 154 and bottom surface 156, opposite top surface 154. Body portion 152, in an embodiment, forms a cylindrical shape which projects upwardly and away from base portion 150. Body portion 152 includes outer surface 160 and defines channel 162.

In an embodiment, base portion 150 comprises a polymer material, such as polyvinyl chloride (PVC) or polyethylene (PE).

Referring also to FIG. 6A, LED assembly 124, in an embodiment, includes base portion 170, first LED connector 176, which in an embodiment is a conductive support post 176, second LED connector, which in an embodiment is a conductive support post 178, LED lamp assembly 180, and optional resistors 220. In an embodiment, one of first LED conductive support post 176 or second LED conductive support post 178 functions as a cathode, and the other as an anode.

In an embodiment, base portion 170 includes body portion 181 with bottom end 177, LED support portion 182, projection or divider portion 184, inside annular surface 186 and outside surface 188. Base portion 170 may also define one or more slots 171 configured to engage portions of rim 136 of reflector 130

Body portion 181, in an embodiment, forms a circular shape and defines cavity 190, which is configured to receive a portion of sealing portion 122, including base portion 156, as well as a lower portion of reflector 130. LED support portion 182 projects upwardly and away from a center of body portion 181 and defines a pair of channels 222 configured to receive first conductive support post 176 and second conductive support post 178, respectively, as well as resistors 220, when present. LED support portion 182 may include a base portion and a narrower projection portion that defines the pair of channels. Body portion 181 forms annular surface 186, which fully or partially encircles LED support portion 182, and is configured to fit adjacent to bottom surface 156 of base portion 150. Cavity 190, in an embodiment, is ring or toroidal shaped and is configured to receive base portion 150.

Projection portion 184 projects downward and away from body portion 181. In an embodiment, projection portion 184 includes base portion 200 connected to projection portion 202. In an embodiment, base portion 200 is integrally formed with projection portion 202. Base portion 200 may have a width W1 that is greater than a width W2 of projection portion 202. In an embodiment, a depth of base portion 200 may be substantially equal to a depth of projection portion 202. In an embodiment, base portion 200 and/or projection portion 202 may function as a key, fitting into a keyway of lamp socket 102 to limit connecting orientations. In an embodiment, base portion 200 may define a pair of opposing channels 222, one on a left side, another on a right side, separated by wall 173, configured to receive bent portions of LED support posts, resistor 220 leads 221, or other conductive structures in electrical connection with LED assembly 180. Conductive terminating ends 201 and 203 extend through lower openings in channels 222 in base 200, the openings being in communication with the base channels 222 and extend outside of base 200 for electrical connection to wire terminals 126. Conductive terminating ends 201 and 203 may be resistor 220 leads (when a resistor 220 is present), or may be ends of conductive support posts 176 and 178 projecting out of base 200 and bent upwards. In an embodiment, the lower ends of channels 222 and portions of terminating ends 201 and 203 may be filled with, or coated with a sealing material, such as epoxy, conformal coating, glue and so on.

Projection portion 184 in this embodiment may also include key or ridge 352 extending along an exterior portion of projection portion 184. In the embodiment depicted, ridge portion 352 extends vertically from a top end of projection portion 184 to a bottom end of projection portion 184 and may also extend horizontally along a bottom surface of projection portion 184. In an embodiment, ridge 352 is an extension of wall 173 that projects or resides outside of base 170. Ridge 352 may be configured to fit into a corresponding slot in lamp holder 102.

First LED conductive support post 176 projects upwardly and away from LED support portion 182, with a first end received into a channel 222. In an embodiment, a second end 224 of LED conductive support post 176 forms an angle, which may be a 90° angle, such that second end 224 includes a portion that is transverse to other portions, including the first portion of support post 176.

Second LED conductive support post 178 projects upwardly and away from LED support portion 182, with a first end 225 received into a channel 222, and a second end 226 connected to LED assembly 180.

First and second LED conductive support posts 176, 178 are electrically and mechanically connected to LED assembly 180, thereby mechanically supporting a position of LED assembly 180 and providing a source of electricity when large-reflector LED bulb assembly 106 is powered via insulated conductors 104. In an embodiment, second ends 224 and 226 may be respectively soldered to ends of LED 180.

First and second LED conductive support posts 176, 178 may be secured in channels 222 using an epoxy or similar material or glue, which secures and seals, such as a conformal coating.

Referring also to FIG. 6A, which is an electrical schematic of LED assembly 180, in an embodiment, LED assembly 180 includes a plurality of LEDs 230 that are electrically connected to one another in series, such that first LED conductive support post 176 or resistor 220 is connected to a cathode (or anode) of a first LED 230, while a second resistor 220 or second LED conductive support post 178 is connected to an anode (or cathode) of a last LED 230. In alternate embodiments, LEDs 230 may be arranged in parallel or in series-parallel. Further, the quantity of LEDs 230 in each LED assembly 180 may vary depending on desired operating voltage of the LED bulb assembly 100, electrical characteristics of the decorative-lighting string 110 into which LED bulb assembly 100 is to be connected, as well as other factors, such as desired brightness or illumination. Although two resistors 220 are depicted, in an alternate embodiment, only one resistor 220 is present (connected to one of post 176 or 178), or as described above, no resistors 220.

In an embodiment, LED assembly 180 may also include a bridge rectifier circuit or diode bridge to rectify and condition incoming AC current into a pulsating or DC current.

Figure 6B:
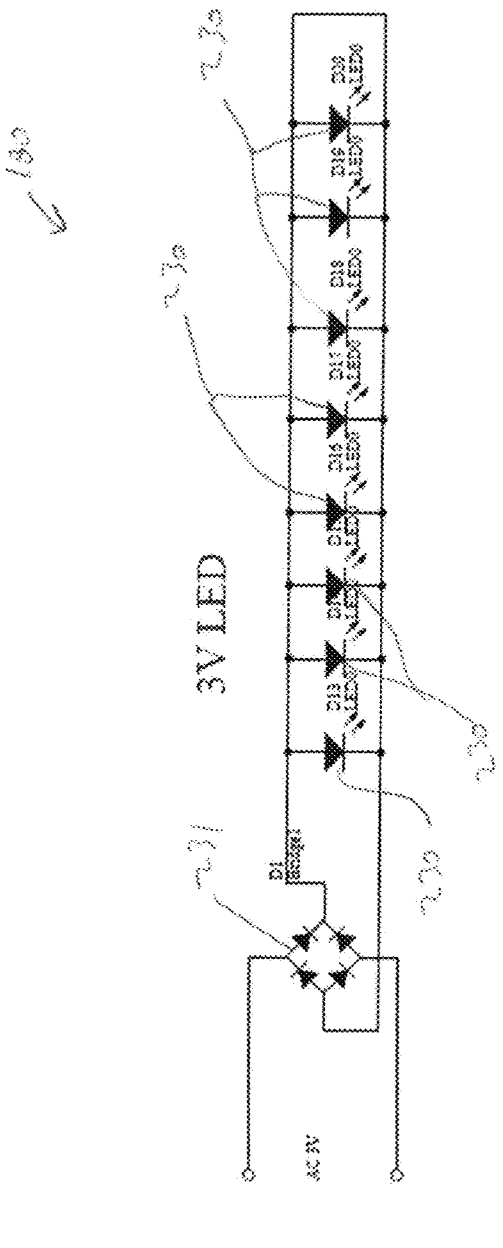
FIG. 6B is an electrical schematic diagram of an LED bulb assembly, according to an embodiment of the present disclosure, and including a full-wave rectifier diode bridge.

Referring also to FIG. 6B, a circuit diagram of an embodiment of LED assembly 180 is depicted. In this embodiment, LED lamp assembly 180 is configured to operate on 3 VAC, and includes diode bridge 231 for rectifying the incoming 3 VAC voltage to a 3 VDC or to a 3 V pulsed signal. In this embodiments, LEDs 230 are all electrically connected in parallel, each comprising an LED rated for 3 volts or thereabouts. In this embodiment, eight LEDs are used in LED lamp assembly 180, though more may be used if more brightness is desired, and fewer may be used if a lower current draw or brightness is desired. In this embodiment, diode bridge 231 comprises four rectifying diodes that are not LEDs.

Figure 6C:
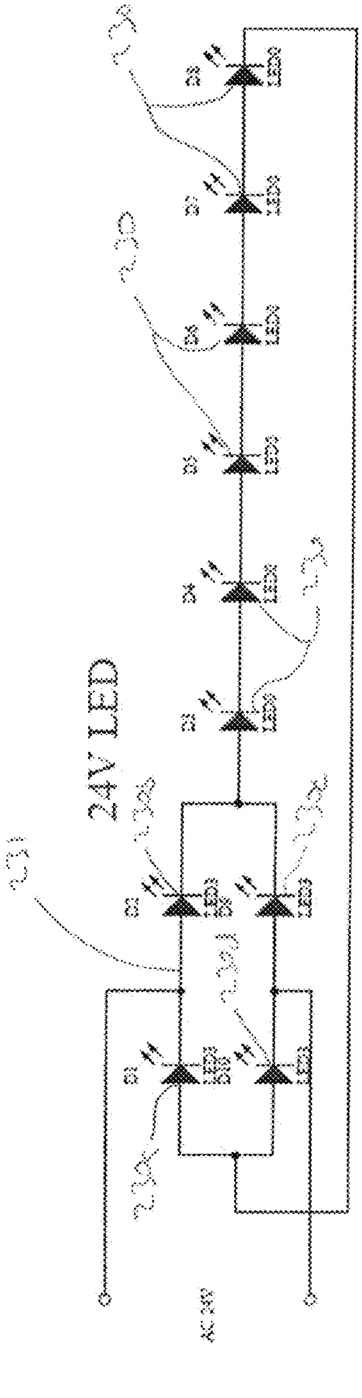
FIG. 6C is an electrical schematic diagram of an LED bulb assembly, according to an embodiment of the present disclosure, and including a rectifier bridge that includes LEDs.
Figure 6D:
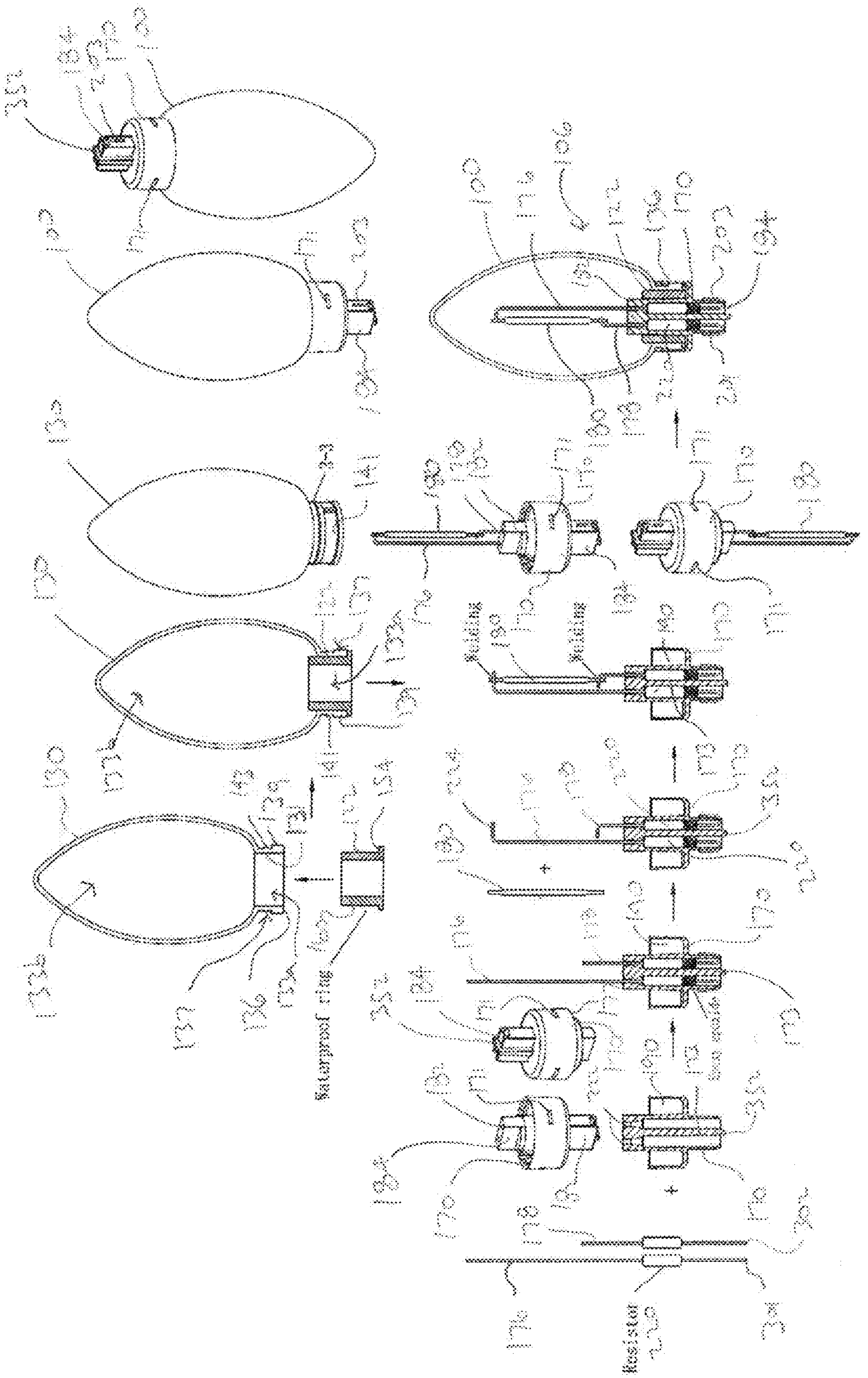
FIG. 6D is a series of depictions of various components and sub-assemblies of an LED bulb assembly of the present disclosure, with some views of a base portion and reflector in sectional view.
Figure 7:
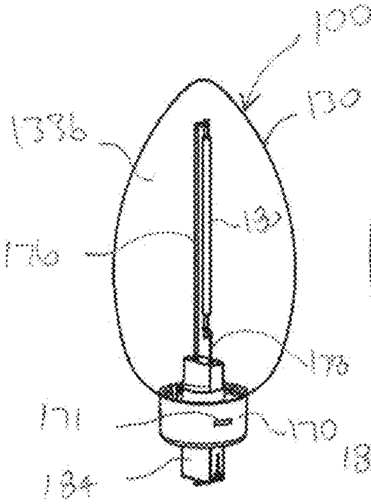
FIG. 7 is a perspective view of an LED lamp assembly having a large reflector and long LED assembly, configured to fit into a wire-piercing lamp socket, according to an embodiment of the present disclosure.
Figure 8:
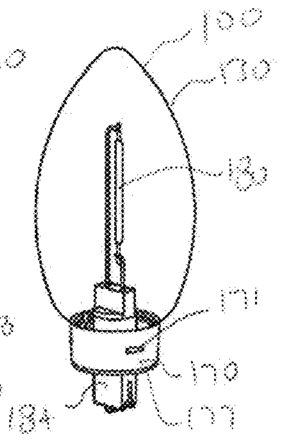
FIG. 8 is a perspective view of an LED lamp assembly having a reflector and LED assembly, configured to fit into a wire-piercing lamp socket, according to an embodiment of the present disclosure.
Figure 9:
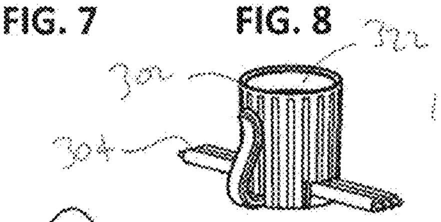
FIG. 9 is a perspective view of a wire-piercing lamp socket configured to receive the LED lamp assembly of FIG. 8, according to an embodiment of the present disclosure.
Figure 10:
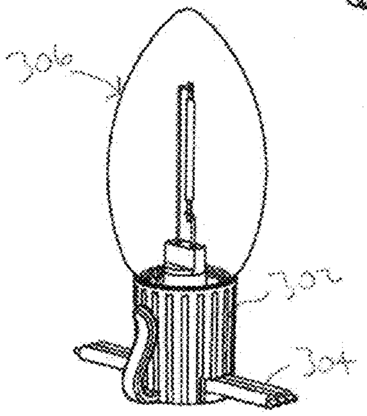
FIG. 10 is a perspective view of the LED bulb assembly of FIG. 8 as assembled into the wire-piercing lamp socket of FIG. 9 and on a set of parallel wires.
Figure 11:
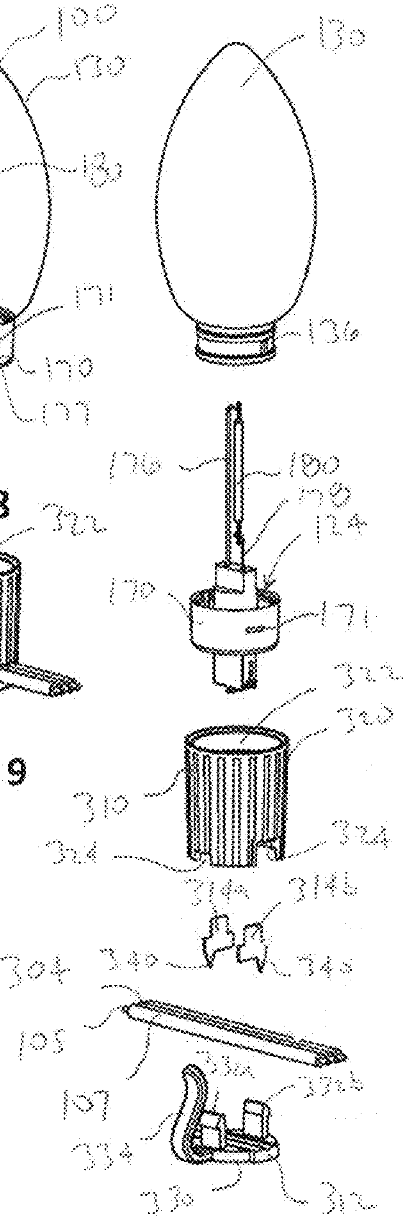
FIG. 11 is an exploded view of the LED lamp assembly with socket and wires of FIG. 10.
Figure 12:
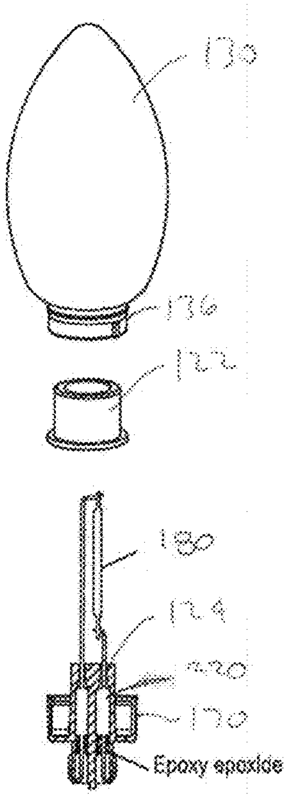
FIG. 12 is perspective view of a reflector and sealing portion, as well as a base portion in centerline cross section, according to an embodiment of the present disclosure.
Figure 13:
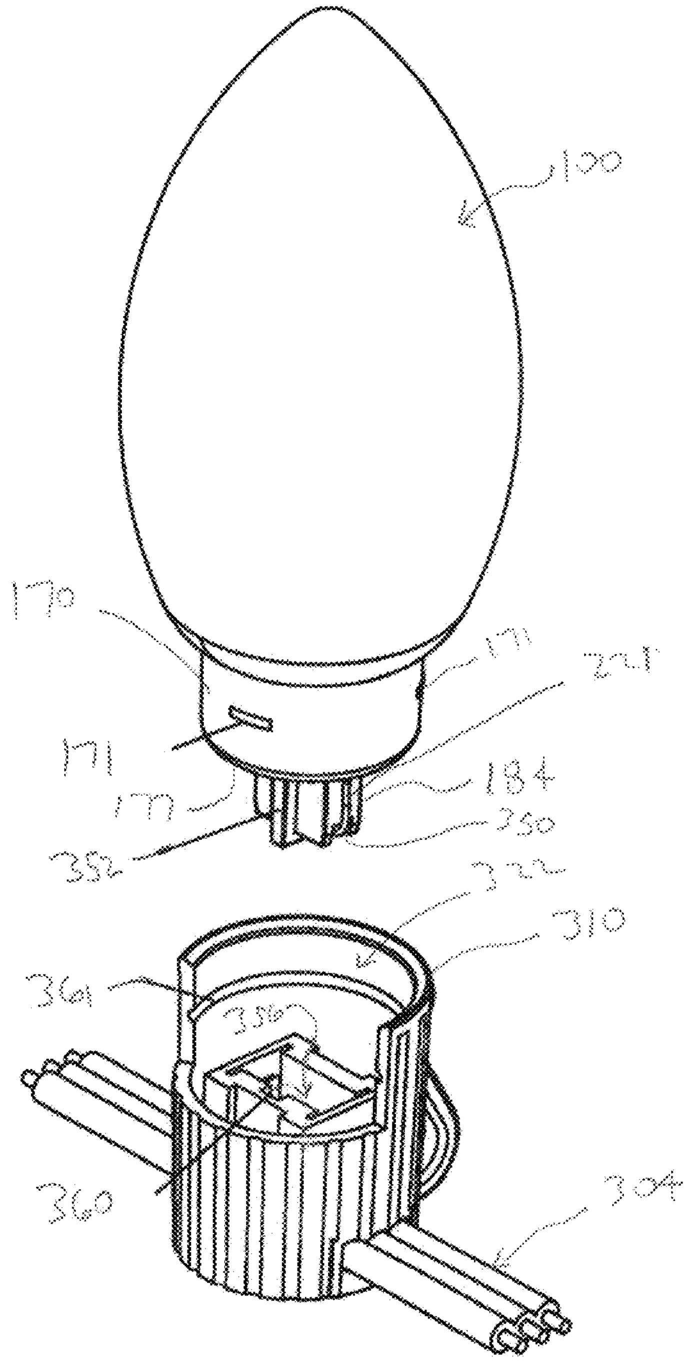
FIG. 13 is a perspective view of an embodiment of an LED lamp assembly and a wire-piercing lamp socket with a section cut away for illustration purposes, according to an embodiment of the present disclosure.
Figure 15:
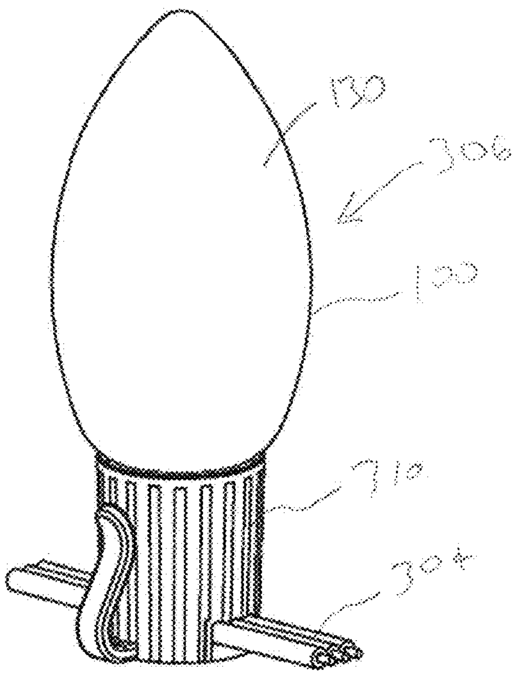
FIG. 15 is a perspective view of the LED lamp assembly and wire-piercing lamp socket of FIG. 14 assembled together onto a set of parallel wires, according to an embodiment of the present disclosure.
Figure 14:
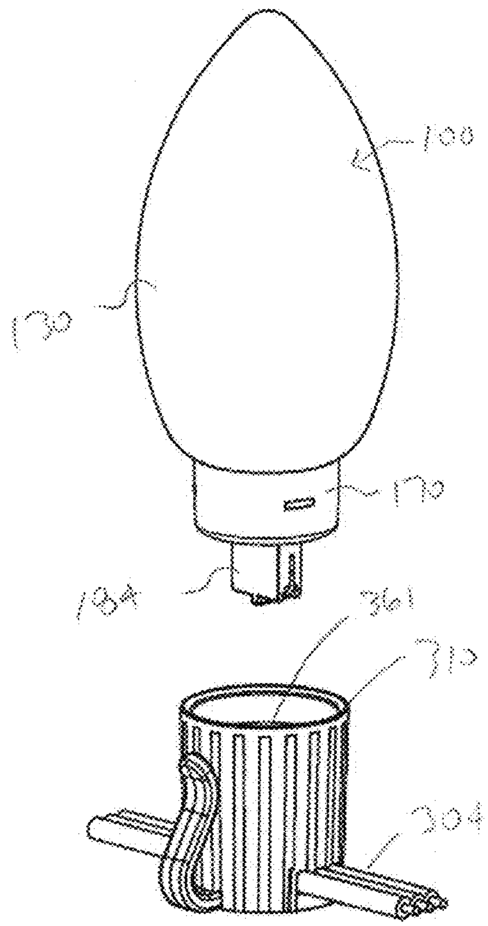
FIG. 14 is a perspective view of an embodiment of an LED lamp assembly and a wire-piercing lamp socket, according to an embodiment of the present disclosure.
Figure 16:
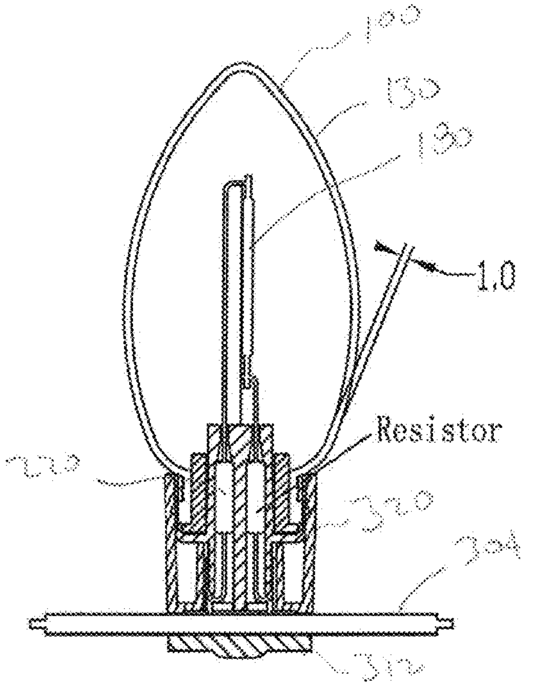
FIG. 16 is a centerline sectional view of the LED lamp assembly and wire-piercing lamp socket assembled together onto a set of parallel wires, according to the embodiment of FIG. 15.

Referring also to FIG. 6C, in another embodiment, LED assembly 180 is configured to operate with 24 VAC operating voltage. In this embodiment, four LEDs 230, namely LEDs 230*a*, 230*b*, 230*c* and 230*d*, form a diode bridge 231 for rectifying incoming power to be received by the other LEDs 230. The other, non-bridged LEDs 230 are wired in series, and each are rated for 3V.

In an embodiment, LEDs 230 may be mechanically attached to a base portion and covered with a sealing and illumination enhancement material, such as a phosphor material.

Resistor 220 when present, may be electrically connected in series to LED assembly 180, and to LEDs 230, via connection to first and second LED conductive support posts 176, 178. In an embodiment, and as depicted, first/upper conductive leads of resistors 220 are connected to first and second LED conductive support posts 176, 178. Second/lower conductive leads 201, 203 of resistor 220 extend outside of body portion 181 and are exposed to be connectable to electrical terminals 126.

Electrical terminals 126 are clamped onto conductive portions of insulated conductors 104 and are configured to connect to first and second LED conductive support members 176 and 178, which may be via resistor 220.

Referring to FIG. 5, lamp socket 102, which may also be referred to as a lamp holder, includes top portion 250, which is a lamp-base-receiving portion, and bottom portion 252, which is an insulated-conductor-receiving portion. Top portion 250 defines socket cavity 254, which is configured to receive body portion 181 of lamp base 170. Bottom portion 252 defines a lower or wire-receiving cavity with an upper opening in communication with socket cavity 254 and a lower opening 255, such that bottom portion 252 is in mechanical communication with socket cavity 254. The lower opening is configured such that wires 104 and connected electrical terminals 126 may pass through to be positioned and secured within the cavity of bottom portion 252. Lower cavity also receives projection 184.

Referring to FIGS. 1, 5, 6 (includes centerline cross-section of base portion 170) and 6D (includes glove 130 and ring 122 in centerline cross section), when assembled, body portion 152 of sealing portion 122 (depicted in centerline cross section in FIG. 6D) is fit into lower cavity 133*a* of reflector 130, which may form a friction fit for sealing and water tightness, such that surface 160 contacts an interior surface 131 of reflector 130 and surface 154 of base portion 150 seats against rim 136 of reflector 130. LED 180 and upper ends 224 and 226 of posts 176 and 178, respectively, are inserted into upper cavity 133*b* of reflector 130. Lower portion 134 of reflector 130 with sealing portion 122 is fit into cavity 190 of body portion 181 of base portion 170, such that lower surface 156 seats and seals against annular surface 186 of base portion 170. LED lighting assembly 124 is fit into lamp socket 102, such that base portion 170 is fit into cavity 254 of top portion 250 of lamp socket 102. Projection portion 184 extends within bottom portion 152 and separates a first insulated conductor 104 from a second insulated conductor 104, creating an insulated barrier between conductors 104 and electrical terminals 126. In an embodiment, insulated conductors may comprise 22 AWG conductors.

In an embodiment rim 136 of lower portion 134 of reflector 130 may have a contoured outer surface 137 that forms projecting rings 139 and 143, and defines channel 141. In an embodiment, when rim 136 is fit into lamp socket 102, contoured outer surface 137 abuts inside annular surface 186 of base portion 170, thereby forming another sealing region between reflector 130 and base portion 170. Portions of contoured outer surface 137, such as rings 139 or 143 may be configured to be received into slots 171 of body portion 170, thereby securing reflector 130 to base 170.

Referring to FIGS. 7-36, an embodiment of large-reflector decorative-lighting assembly 306 is depicted. In this embodiment, large-reflector decorative-lighting assembly 306 is very similar to large-reflector decorative-lighting assembly 106, but in contrast, employs a different lamp base and wire connection. More specifically, in an embodiment, large-reflector decorative-lighting assembly 306 comprises push-in large-reflector LED bulb assembly 100, substantially described above, with lamp socket 302. Large-reflector decorative-lighting assembly 306 electrically and mechanically connects to wire set 304 of insulated conductors 104 via insulation-piercing electrical terminals 314, as described further below. Wire set 304 comprises a plurality of insulated conductors (wires) 104 that are arranged in parallel to one another. Each insulted conductor 104 includes a conductor portion 105 and an outer insulating portion 107.

Lamp socket 302, in an embodiment, includes socket portion 310 and cap portion 312, and one or more wire-piercing electrical terminals 314, including a first wire-piercing electrical terminal 314*a* and a second wire-piercing electrical terminal 314*b*.

Socket portion 310, in an embodiment, includes body portion 320 having a generally cylindrical wall and defining a socket cavity 322. Body portion 320, in an embodiment, defines one or more cut-outs or recesses 324 configured to receive portions of wire set 304. Socket portion 310 may comprise a generally non-conductive material, such as a polymer, which may be PVC.

In an embodiment, socket cap 312 includes covering portion 330, connecting projections 332, including first connecting projection 332*a* and second connecting projection 332*b*, and hook 334.

Covering portion 312, in an embodiment, is configured to form a bottom cap or cover to cover an opening of cavity 322 of body portion 320. In an embodiment, covering portion 312 may be generally flat, though may include channels for receiving portions of wires 104 of wire set 304.

Connecting projections 332 project upward and away from an inner surface of covering portion 312 and may include a hook or projection on a distal end to engage with, and/or be received by, structure of body portion 320, so as to connect covering portion 312 to body portion 320, containing and stabilizing wire set 304 therebetween.

Insulation-piercing electrical terminals 314 are coupled to body portion 320, are conductive, and include insulation-piercing portions 340 configured to pierce insulation 107 of wires 104, thereby making electrical connection with conductors 105 of wires 104. Embodiments of wire-piercing electrical terminals and lamp sockets for connection to parallel wires are described in U.S. Pat. No. 8,853,721, issued Oct. 7, 2014, and entitled Wire-Piercing LED Lead Frame, which is incorporated herein by reference in its entirety.

During assembly of lamp socket 302 to wire set 304, body portion 320 with secured terminals 314 is place atop wires 104, cap portion 312 is placed below wires 104, and force is applied to cap portion 312 and/or body portion 320 causing them to move toward each other and causing insulation-piercing portions 340 to pierce insulation 107, such that lamp socket 302 and cap portion 312 are mechanically joined and insulation-piercing electrical terminals 314 are in electrical connection with one or more conductors 105 of wire set 304. Large-reflector LED bulb assembly 100 is pushed into lamp socket 302, such that base portion 170 is received into socket cavity 322, and LED lamp assembly 180 is in electrical connection with terminals 314.

Referring specifically to FIGS. 13-16, another embodiment of large-reflector decorative-lighting assembly 306 is depicted. This embodiment is substantially the same as the embodiment depicted and described above with respect to FIGS. 7-12, though in this embodiment, projection portion 184 forms a key and lamp socket 310 includes structure forming a keyway, as described further below.

In this embodiment, projection portion 184 includes a pair of lamp conductor recesses 350 at an end of projection portion 184 configured to receive portions of bent resistor 220 bent leads 221. More generally, recesses 350 may be configured to receive resistor leads, support posts, or other conductive portions of LED assembly 100 intended to connect to wire set 304. Projection portion 184 in this embodiment may also include key or ridge 352 extending along an exterior portion of projection portion 184. In the embodiment depicted, ridge portion 352 extends vertically from a top end of projection portion 184 to a bottom end of projection portion 184 and may also extend horizontally along a bottom surface of projection portion 184.

Lamp socket 310 includes keyway portion 354 defining keyway 356. Keyway portion 354, in an embodiment, and as depicted, forms a walled structure configured to receive projection portion 184 in only one orientation. In particular, ridge or key portion 352 is configured to be received in channel 360 of keyway portion 354.

In an embodiment, lamp socket 310 may also include step or shoulder 361 configured to abut bottom portion 177 of base 170. In an embodiment, step 361 extends circumferentially about an inner surface 363 of lamp socket 310. Step 361 may also be present in lamp socket 302 of the prior embodiment.

FIGS. 17-36 provide additional views of large-reflector LED bulb assembly 100 and decorative-lighting assembly 306 in a wire-piercing configuration, substantially the same as those described above with respect to FIGS. 7-16.

Figure 17:
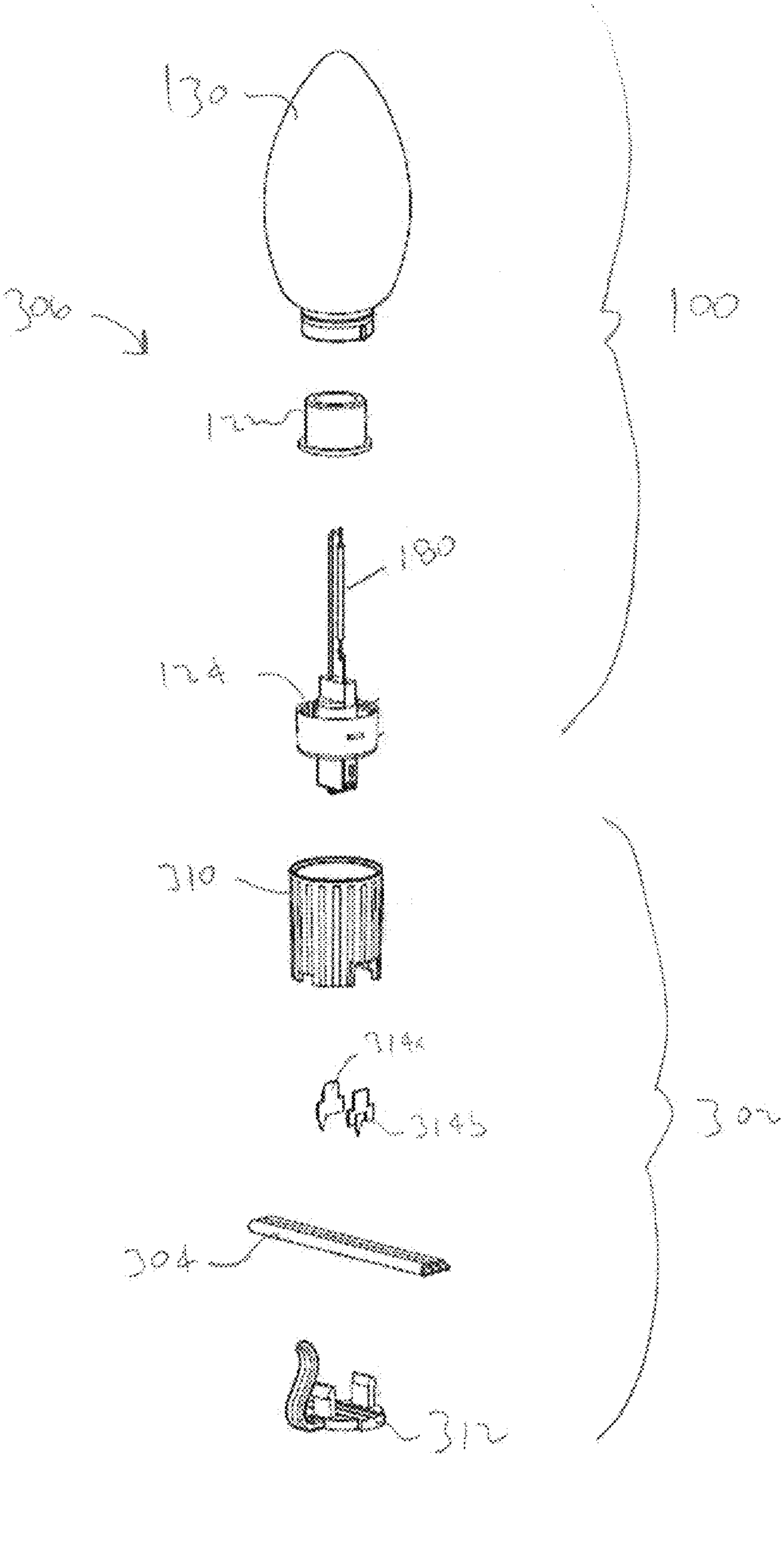
FIG. 17 is an exploded view of the push-in, large-glove LED bulb assembly and wire-piercing lamp socket with a set of parallel wires, according to the embodiment of FIG. 16.

FIG. 17 is an exploded view of push-in, large-glove LED bulb assembly 100 and wire-piercing lamp socket 302 with wire set 304.

Figure 20:
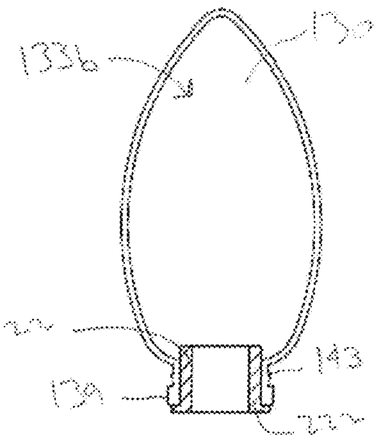
FIG. 20 is a center sectional view of a reflector assembled with a sealing portion of an LED bulb assembly, according to the embodiment of FIG. 18.
Figure 18:
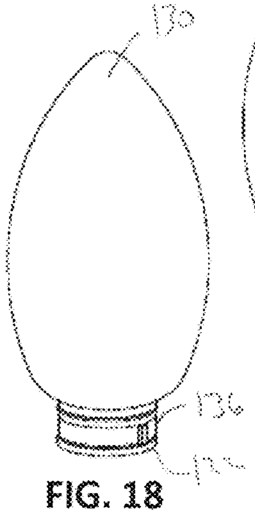
FIG. 18 is a perspective view of a reflector assembled with a sealing portion of an LED bulb assembly, according to an embodiment of the present disclosure.
Figure 19:
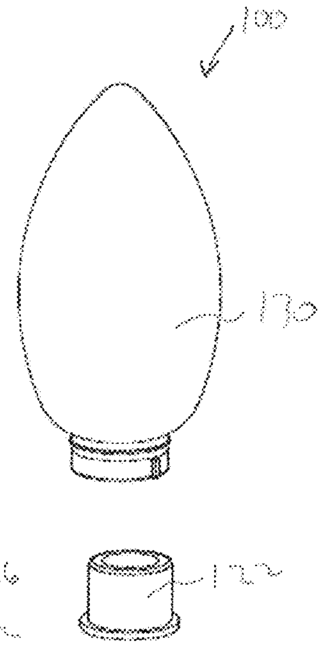
FIG. 19 is a perspective view of a reflector and a sealing portion of an LED bulb assembly, according to the embodiment of FIG. 18.
Figure 23:
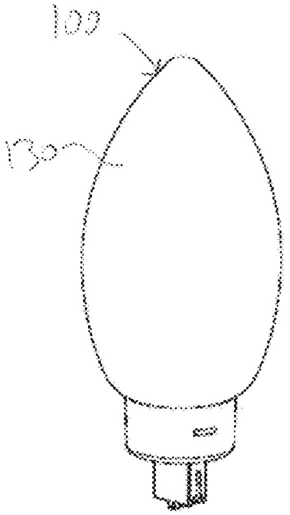
FIG. 23 is a perspective view of an LED lamp assembly comprising the components of FIGS. 18-22.
Figure 24:
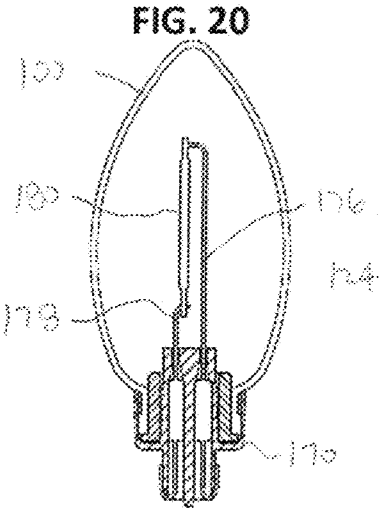
FIG. 24 is a center sectional view of the LED lamp assembly of FIG. 23.
Figure 21:
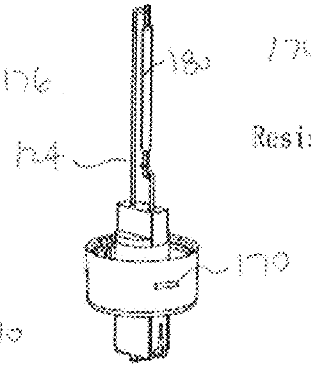
FIG. 21 is a perspective view of an LED lighting assembly that includes a base portion, conductive support portions and an LED lamp assembly.
Figure 22:
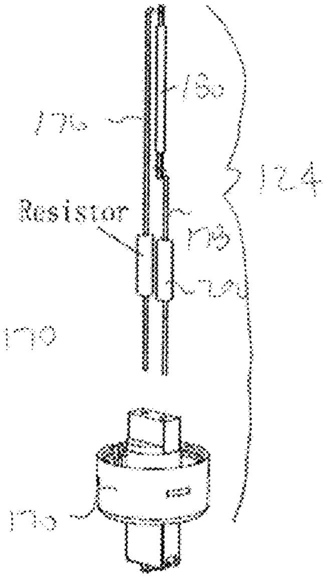
FIG. 22 is an exploded view of the assembly of FIG. 21.

FIGS. 18-24 depict various views of LED bulb assembly 100. More specifically, FIG. 18 is a perspective view of reflector 130 assembled with sealing portion 122 of an LED bulb assembly 100, according to an embodiment of the present disclosure; FIG. 19 is a perspective view of reflector 130 and a sealing portion 122 of an LED bulb assembly 100, according to the embodiment of FIG. 18; FIG. 20 is a center sectional view of reflector 130 assembled with sealing portion 122 of an LED bulb assembly 100, according to the embodiment of FIG. 18; FIG. 21 is a perspective view of an LED lighting assembly 100 that includes base portion 170, conductive support portions 176, 178 and an LED assembly 180; FIG. 22 is an exploded view of the assembly of FIG. 21; FIG. 23 is a perspective view of an LED lamp assembly 100 comprising the components of FIGS. 18-22; and FIG. 24 is a center sectional view of the LED lamp assembly 100 of FIG. 23.

Figure 26:
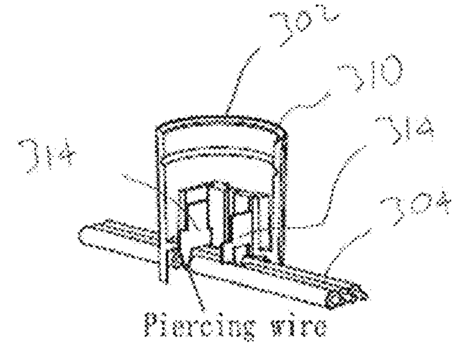
FIG. 26 is an embodiment of a wire-piercing lamp socket, wire-piercing terminals and set of parallel wires according to the embodiment of FIG. 25, with a portion of the lamp socket cut away for illustration purposes.
Figure 25:
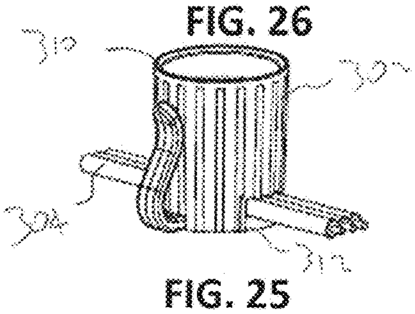
FIG. 25 is a perspective view of a wire-piercing lamp socket assembled to a set of parallel wires, according to an embodiment of the present disclosure.
Figure 27:
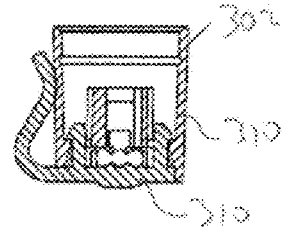
FIG. 27 is a center sectional view of an embodiment of a wire-piercing lamp socket, according to an embodiment of the present disclosure.
Figure 28:
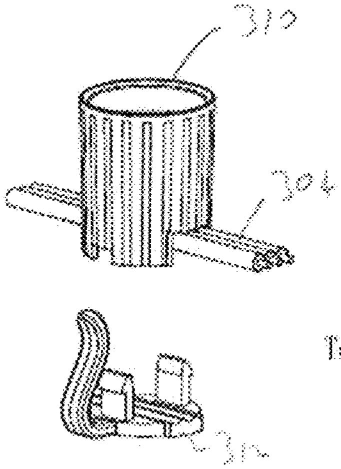
FIG. 28 is a perspective view of a wire piercing lamp socket with wires of FIGS. 25-26, with a cap removed.
Figure 29:
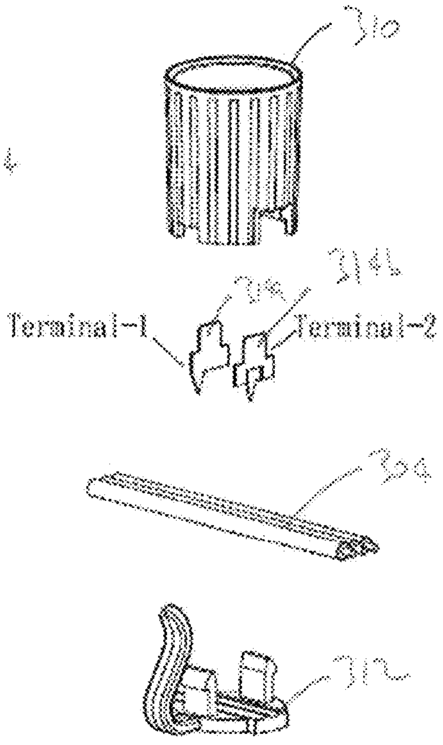
FIG. 29 is an exploded view of the wire-piercing lamp socket with wires of FIGS. 25-28.

FIGS. 25-29 depict various views of wire-piercing lamp socket 302 with wire set 304. More specifically, FIG. 25 is a perspective view of wire-piercing lamp socket 302 assembled to a set of parallel wires 304; FIG. 26 is an embodiment of wire-piercing lamp socket 302, wire-piercing terminals 314 and set of parallel wires 304, according to the embodiment of FIG. 25, with a portion of the socket portion 310 cut away for illustration purposes; FIG. 27 is a center sectional view of an embodiment of a wire-piercing lamp socket 302; FIG. 28 is a perspective view of wire piercing lamp socket 302 with wire set 304 of FIGS. 25-26, with cap 312 removed; and FIG. 29 is an exploded view of the wire-piercing lamp socket 302 with wire set 304 of FIGS. 25-28.

FIGS. 30-36 depict various configurations of lamp socket 302 with wire-piercing terminals 314 piercing insulation, the various configurations producing various electrical connections to wire set 304.

Figure 30:
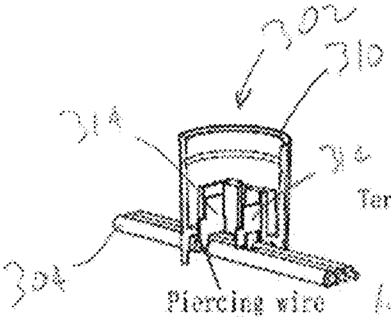
FIG. 30 is an embodiment of a wire-piercing lamp socket, wire-piercing terminals and set of parallel wires according to the embodiment of FIG. 25, with a portion of the lamp socket cut away for illustration purposes.

FIG. 30 depicts a sectional view of wire-piercing lamp socket 302, with socket portion 310 in cutaway revealing insulation-piercing terminals 314 engaged with wire set 304.

Figure 32:
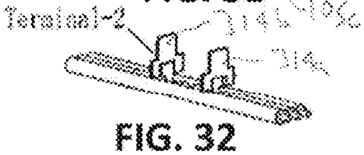
Figure 33:
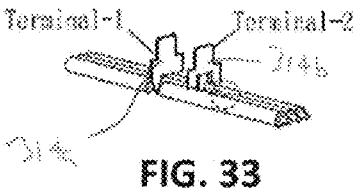
Figure 34:
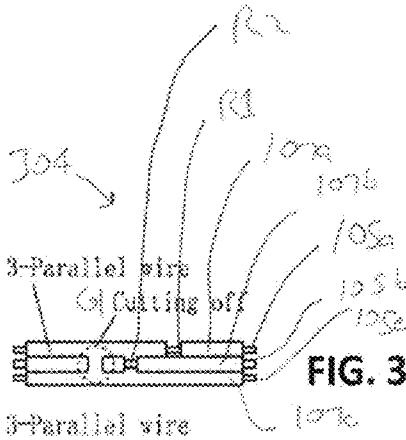
FIGS. 34-36 are perspective views of a set of parallel wires with varying cut out portions.
Figure 35:
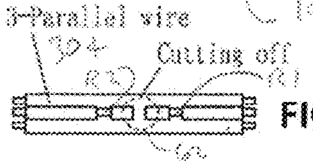
Figure 36:
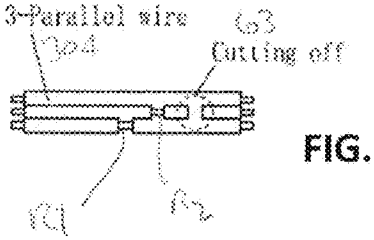

Referring to FIGS. 31-36, each wire set 304 includes three wires or insulated conductors 104, namely first wire 104*a* with first conductor 105*a* and first insulation 107*a*, second wire 104*b* with second conductor 105*b* and second insulation 107*b*, and third wire 104*c* with third conductor 105*c* and third insulation 107*b*. Two insulation-piercing or wire-piercing terminals 314, namely 314*a* and 314*b*, are depicted, with each terminal 314 piercing one insulation of one wire to make an electrical connection from lamp socket 102 and connected LED bulb assembly 100 to the two wires 104 that are electrically connected to the terminals. In FIGS. 34-36, sections of one wire 104 have been removed to form a gap G in the wire 104, which facilitates making various electrical connections between LED bulb assemblies 100, as described further below. Regions R refer to regions of wire 104 that have been pierced by terminals 314 such that the wire 104 is in electrical connection with the terminal and an LED bulb assembly 100.

Figure 31:
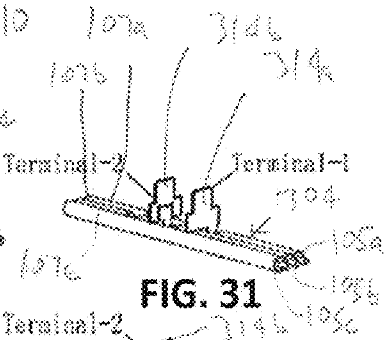
FIGS. 31-33 are perspective views of two wire-piercing terminals connected to a set of parallel wires making electrical connections to different combinations of individual wires.

Referring specifically to FIG. 31, first terminal 314*a* pierces insulation 105*a* or wire 104*a*, abuts conductor 107*a*, and connects the terminal 314*a* to conductor 107*a* of wire 104*a*. Second terminal 314*b* pierces insulation 105*b* or wire 104*b*, abuts conductor 107*b*, and connects terminal 314*b* to middle conductor 107*b* of wire 104*b*. In this configuration, lamp socket 302 and an associated LED bulb assembly 100 would make an electrical connection across wires 104*a* and 104*b*.

Referring also to FIG. 34, terminals 314*a* and 314*b* are electrically connected to wires 104*a* and 104*b*, respectively, in accordance with the embodiment of FIG. 31. However, in this embodiment, gap G1 is present in wire 104*b* and its corresponding conductor 107*b*.

Referring to FIGS. 32 and 35, first terminal 314*a* pierces insulation 105*b* or wire 104*a*, abuts conductor 107*b*, and connects the terminal 314*a* to conductor 107*b* of wire 104*b*. Second terminal 314*b* also pierces insulation 105*b* or wire 104*b*, abuts conductor 107*b*, and connects terminal 314*b* to middle conductor 107*b* of wire 104*b*. A gap G2 is between region s R1 and R2 where terminals 314*a* and 314*b* connect. In this configuration, lamp socket 302 and an associated LED bulb assembly 100 would make an electrical connection across gap G2 on wire 104*b*.

Referring to FIGS. 33 and 36, first terminal 314*a* pierces insulation 105*c* or wire 104*c*, abuts conductor 107*c*, and connects the terminal 314*a* to conductor 107*c* of wire 104*c* at region R1. Second terminal 314*b* pierces insulation 105*b* or wire 104*b*, abuts conductor 107*b*, and connects terminal 314*b* to middle conductor 107*b* of wire 104*b* at region R1. A gap G3 is adjacent to region R2.

The various connection configurations of FIGS. 31-36 may be used to form different types of electrical connections between LED bulb assemblies 100 to form decorative-lighting strings 100 with varying electrical circuit configurations, such as series-connected, parallel-connected, and series-parallel connected strings 100.

The embodiments above are intended to be illustrative and not limiting. Additional embodiments are within the claims. In addition, although aspects of the present invention have been described with reference to particular embodiments, those skilled in the art will recognize that changes can be made in form and detail without departing from the spirit and scope of the invention, as defined by the claims.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as understood by persons of ordinary skill in the art.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. A water-resistant, push-in type decorative-lighting assembly, comprising:
- a reflector defining a reflector cavity;
- an LED assembly including a plurality of light-emitting diodes (LEDs);
- a pair of conductive connectors electrically connected to the LED assembly, including a first conductive connector electrically connected to a first end of the LED assembly and a second conductive connector electrically connected to a second end of the LED assembly;
- a base portion including a body portion, a projection portion projecting from a bottom end of the body portion, and an LED support portion, the body portion defining a cavity receiving a lower portion of the reflector, and the body portion defining a first channel and a second channel, the first channel receiving a portion of the first conductive connector and the second channel receiving a portion of the second conductive connector, an end of the first conductive connector extending out of the first channel and an end of the second conductive connector extending out of the second channel;
- a lamp socket defining an upper cavity receiving the body portion of the base portion and a lower cavity receiving the projection portion of the base portion and the ends of the first and second conductive connectors; and
- a sealing portion attached to the lower portion of the reflector, the sealing portion including an annular ring connected to a cylindrical portion, the cylindrical portion extending into the reflector cavity while the annular ring remains outside of the reflector cavity and abuts one or more interior surfaces of the body portion of the base portion.

2. The decorative-lighting assembly of claim 1, wherein the first conductive connector forms a first conductive support post extending outwardly from the base portion and into the reflector cavity, and the second conductive connector forms a second conductive support post extending outwardly from the base portion and into the reflector cavity, the first conductive support post having a length that is longer than a length of the second conductive support post.

3. The decorative-lighting assembly of claim 2, further comprising a first resistor, wherein the first conductive support post comprises a first connecting lead of the first resistor, and the end of the first conductive connector extending out of the first channel comprises a second connecting lead of the first resistor.

4. The decorative-lighting assembly of claim 2, wherein first conductive support post includes an end portion extending transversely from a main portion of the first conductive support post, the LED assembly connected to the end portion and extending downwardly toward an end of the second conductive support post.

5. The decorative-lighting assembly of claim 1, wherein the plurality of LEDs of the LED assembly are electrically connected to one another in series.

6. The decorative-lighting assembly of claim 1, wherein the plurality of LEDs of the LED assembly are electrically connected to one another in parallel.

7. The decorative-lighting assembly of claim 6, wherein the LED assembly further comprises a diode bridge.

8. The decorative-lighting assembly of claim 7, wherein two or more of the LEDs of the plurality of LEDs of the LED assembly form the diode bridge.

9. The decorative-lighting assembly of claim 1, further comprising a sealing material filling a portion of the first channel and the second channel.

10. The decorative-lighting assembly of claim 1, further comprising a first wire with a first electrical terminal and a second wire with a second electrical terminal, the first and second electrical terminals received into the lower cavity of the lamp socket.

11. A decorative-lighting string comprising a plurality of the decorative-lighting assemblies of claim 1, a set of wires, and a power plug.

12. A decorative-lighting string, comprising:
- a power plug configured to electrically connect to a power source;
- a plurality of decorative-lighting assemblies, each decorative-lighting assembly of the plurality of decorative-lighting assemblies including:
  - a reflector defining a reflector cavity;
  - an LED assembly including a plurality of light-emitting diodes (LEDs);
  - a pair of conductive connectors electrically connected to the LED assembly, including a first conductive connector electrically connected to a first end of the LED assembly and a second conductive connector electrically connected to a second end of the LED assembly;
  - a base portion including a body portion, a projection portion projecting from a bottom end of the body portion, and an LED support portion, the body portion receiving a lower portion of the reflector, a portion of the first conductive connector and a portion of the second conductive connector, an end of the first conductive connector extending out of base portion and an end of the second conductive connector extending out of the base portion;
  - a sealing portion attached to the lower portion of the reflector, the sealing portion including an annular ring connected to a cylindrical portion, the cylindrical portion extending into the reflector cavity while the annular ring remains outside of the reflector cavity and abuts one or more interior surfaces of the body portion of the base portion; and
  - a lamp socket receiving the body portion of the base portion and the ends of the first and second conductive connectors; and
- a plurality of wires in electrical connection with the plurality of decorative-lighting assemblies.

13. The decorative-lighting string of claim 12, wherein each lamp assembly of the plurality of lamp assemblies defines an upper cavity receiving the body portion of the base portion and a lower cavity receiving the projection portion of the base portion and the ends of the first and second conductive connectors.

14. The decorative-lighting string of claim 12, wherein each lamp assembly of the plurality of lamp assemblies includes a first wire-piercing terminal electrically connected to a wire of the plurality of wires and a second wire-piercing terminal electrically connected to another of the plurality of wires.

15. The decorative-lighting string of claim 12, wherein each lamp assembly of the plurality of lamp assemblies includes a socket portion defining an upper opening and a lower opening, and a cap portion covering the lower opening.

16. The decorative-lighting string of claim 12, wherein for each lamp assembly of the plurality of lamp assemblies, the first conductive connector forms a first conductive support post extending outwardly from the base portion and into the reflector cavity, and the second conductive connector forms a second conductive support post extending outwardly from the base portion and into the reflector cavity, the first conductive support post having a length that is longer than a length of the second conductive support post.

17. The decorative-lighting string of claim 12, wherein each lamp assembly of the plurality of lamp assemblies includes a socket portion defining an upper opening and a lower opening, and a cap portion covering the lower opening.

18. The decorative-lighting assembly of claim 12, wherein the plurality of LEDs of each LED assembly are electrically connected to one another in series.

19. The decorative-lighting assembly of claim 12, wherein the plurality of LEDs of each LED assembly are electrically connected to one another in parallel.

20. The decorative-lighting assembly of claim 19, wherein each LED assembly further comprises a diode bridge.

* * * * *